(12) United States Patent
Weichbrodt

(10) Patent No.: US 8,973,217 B2
(45) Date of Patent: Mar. 10, 2015

(54) STEERING CASTER

(75) Inventor: Tobias Weichbrodt, Wermelskirchen (DE)

(73) Assignee: STEINCO Paul vom Stein GmbH, Wermelskirchen (DE)

(*) Notice: Subject to any disclaimer, the term of this patent is extended or adjusted under 35 U.S.C. 154(b) by 0 days.

(21) Appl. No.: 13/447,209

(22) Filed: Apr. 14, 2012

(65) Prior Publication Data
US 2013/0097804 A1    Apr. 25, 2013

(30) Foreign Application Priority Data
Apr. 14, 2011   (DE) .................. 10 2011 017066

(51) Int. Cl.
*B60B 33/00*   (2006.01)
*B60B 33/02*   (2006.01)

(52) U.S. Cl.
CPC .......... *B60B 33/0086* (2013.01); *B60B 33/0042* (2013.01); *B60B 33/02* (2013.01); *B60B 33/025* (2013.01); *B60B 2200/26* (2013.01); *B60B 2900/211* (2013.01); *B60B 2900/5112* (2013.01)
USPC ......................................................... 16/35 R

(58) Field of Classification Search
CPC .............................. B60B 33/00; B60B 33/0086
USPC ........ 16/47, 35 R, 18 R; 188/1.12, 19, 20, 31
See application file for complete search history.

(56) References Cited

U.S. PATENT DOCUMENTS

| | | | | | |
|---|---|---|---|---|---|
| 1,863,349 | A | * | 6/1932 | Noelting et al. | 188/69 |
| 3,376,954 | A | * | 4/1968 | Neptune | 188/69 |
| 3,881,216 | A | * | 5/1975 | Fontana | 16/35 R |
| 4,559,668 | A | * | 12/1985 | Black | 16/35 R |
| 5,002,163 | A | * | 3/1991 | Kidd | 188/83 |
| 5,519,916 | A | * | 5/1996 | Mainard | 16/35 R |
| 5,607,030 | A | * | 3/1997 | Swift et al. | 188/1.12 |
| 6,286,184 | B1 | * | 9/2001 | Dean et al. | 16/35 R |
| 6,532,624 | B1 | * | 3/2003 | Yang | 16/35 R |
| 6,839,938 | B2 | * | 1/2005 | Kausemann | 16/35 R |
| 7,086,120 | B2 | * | 8/2006 | Deyerler | 16/35 R |
| 8,418,314 | B2 | * | 4/2013 | Lai | 16/35 R |
| 2003/0163892 | A1 | * | 9/2003 | Kausemann | 16/18 R |
| 2011/0119864 | A1 | * | 5/2011 | Minowa | 16/45 |

FOREIGN PATENT DOCUMENTS

| | | |
|---|---|---|
| DE | 80 14 648 U1 | 5/1980 |
| DE | AS 2927550 | 12/1980 |
| DE | 801 14648 U1 | 12/1982 |
| DE | GM 8525479.7 | 11/1985 |

* cited by examiner

*Primary Examiner* — Emily Morgan
(74) *Attorney, Agent, or Firm* — Von Rohrscheldt Patents

(57) ABSTRACT

A brake for a steering caster which is actuatable with small shifting forces and small shifting travel and creates less noise during shifting. The steering caster includes a head portion; a support portion including at least one arm; and a foot lever for actuating a directional fixation device and for actuating a brake device for at least one wheel including a rim, wherein the rim is covered with a thread protector. The brake device includes at least one rim brake locking element that is actuatable through a foot lever and arranged laterally between the at least one arm and the thread protector connected with the at least one arm, wherein at least one actuation contour is arranged at an inside of the at least one arm and/or at an outside of the thread protector within a movement range of the at least one rim brake locking element.

4 Claims, 5 Drawing Sheets

STEERING CASTER

RELATED APPLICATIONS

This application claims priority from and incorporates by reference German patent application DE 10 2011 017 066.9 filed on Apr. 14, 2011.

FIELD OF THE INVENTION

The invention relates to a steering caster, in particular for medical equipment or similar, including a head component and a support component including at least one arm and a foot lever for actuating a directional fixation and brake device for at least one wheel that is provided with a rim, wherein the rim is covered with a thread protector.

BACKGROUND OF THE INVENTION

A steering caster of this type is known e.g. from DE-GM 8525479.7 in which a step-on brake lever is disclosed that is acting on both sides and arranged at a wheel, wherein the brake lever facilitates pressing two brake components into frictional engagement at a brake surface of a rim in order to achieve a brake effect.

Furthermore, a brake is known from DE-AS 2927550, wherein a brake component also engages a circumferential rim laterally on both sides of a wheel and the brake components are pressed in braking condition into frictional engagement at a brake surface that is arranged at the rim.

Both solutions recited supra have a disadvantage in that the brake devices do not provide a defined braking force irrespective of a wear of the brake component and the brake surface.

Furthermore, a single wheel roller with a foot actuatable brake component is known in the art, wherein the foot lever does not only provide directional fixation but also braking of the wheel. Thus, brake shoes are pressed onto a running surface of the wheel typically through a foot lever with a knuckle joint. In practical applications, it has become evident that the latter brake has numerous disadvantages. Thus, a large switching force is required for actuating the brake which generates disturbing noises, in particular when disengaging the brake. Furthermore, also this brake is not independent from wear, since not only the brake components, but also the wheel itself is subject to wear. Eventually, the actual brake force is not only a function of the wear condition of the brake, but also a function of the hardness and the surface properties and possibly contamination of the wheel.

BRIEF SUMMARY OF THE INVENTION

Thus, it is an object of the invention to provide a new brake for a steering caster, in particular for medical equipment or similar, which is actuatable with small shifting forces and small shifting travel, which generates less noise during shifting and eventually not only provides a defined braking force, but also excludes damaging the wheel.

The object is achieved initially through the features of claim 1, in particular the features of the body of claim 1, wherein the brake device includes at least one movable rim brake locking device that is arranged laterally between an arm and a thread protector connected therewith and actuatable through a foot lever and wherein at least one actuation contour is arranged within the movement range of the rim brake locking element, wherein the actuation contour is arranged at an inner side of the arm and/or at an outside of the thread protector, wherein the actuation contour moves a teething arranged at an inside of the thread protector into a circumferential teething provided at the rim when the foot lever is actuated.

In a particularly advantageous manner, the steering caster can be braked in the brake device according to the invention with a small force and a small shifting path in a defined manner without a change of the brake force occurring over the service life of the steering caster due to wear. Additionally only little noise is generated due to the small shifting force and thus the small shifting path during braking and also during disengaging the brake which is in particular of significant importance when used in medical equipment like e.g. incubators.

In an advantageous embodiment of the invention, the brake device includes two rim brake locking devices that are movable through the foot lever and arranged on both sides of the wheel respectively between an arm and a thread protector connected therewith and in the movement range of the rim brake locking element at least one actuation contour is provided that is arranged at an inside of the arm or at an outside of the thread protector, so that a teething respectively arranged at an inside of the thread protector engages a teething that is circumferentially arranged at the rim when the foot lever is actuated.

This embodiment provides an even more reliable brake device acting upon the rim or the wheel on both sides.

BRIEF DESCRIPTION OF THE DRAWINGS

Additional advantages of the invention can be derived from the subsequent dependent claims and from the description of an embodiment, wherein:

DETAILED DESCRIPTION OF THE INVENTION

Figure 1:
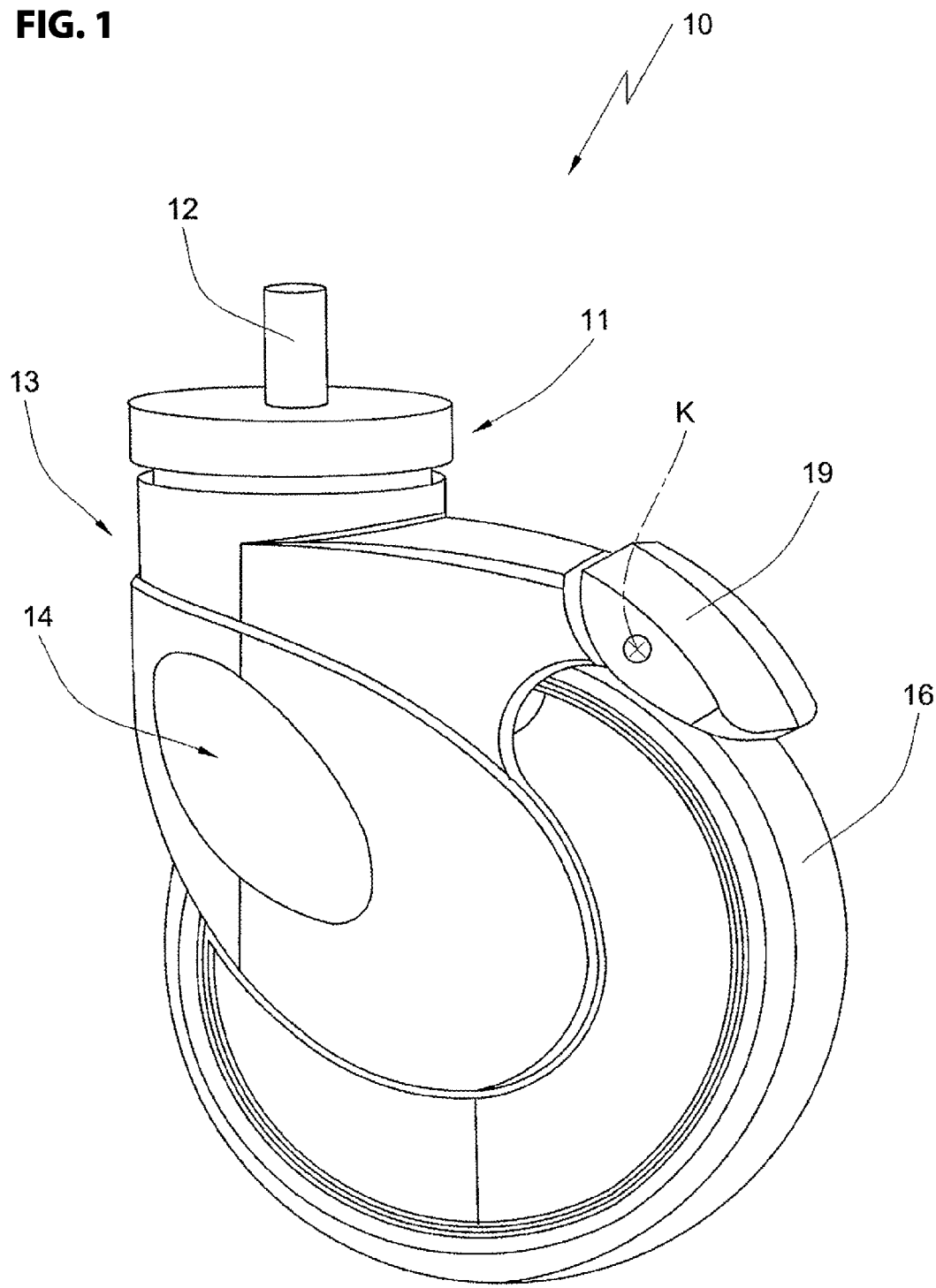
FIG. 1 illustrates a perspective view of a one-wheel steering caster.
Figure 2:
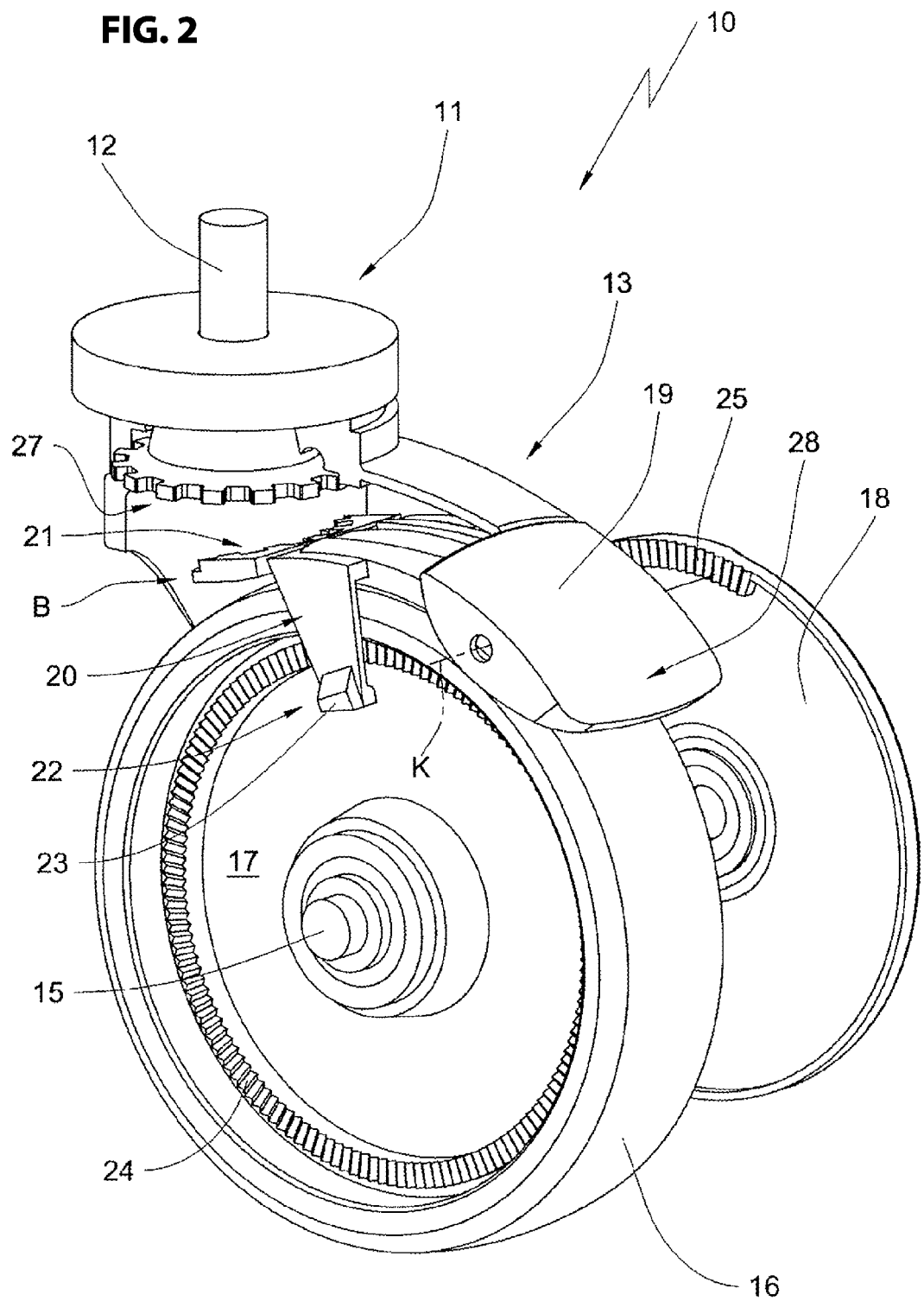
FIG. 2 illustrates a one-wheel steering caster according to FIG. 1 with a partially removed support element in non-braked condition.

In the drawings, a one-wheel steering caster is designated overall with reference numeral 10. The one wheel steering caster 10 includes a head element 11 with a rear bolt 12 and a support element 13 with two arms 14. Between the arms 14 a wheel 16 is supported through a wheel axle 15, wherein the wheel includes a rim 17 which is covered with a thread protector 18 (c.f. FIG. 2). The thread protector 18 is arranged torque proof at the arms 14 of the support component 13.

A brake device B is arranged at the support element 13 above the wheel 16, wherein the brake device is operable with a foot lever 19 which is configured as a pivot lever supported at a pivot axis K and connected with a brake component 20. The brake component 20 on the one hand side includes a directional fixation element 21 oriented towards the rear bolt 12 and on the other hand side includes two laterally arranged rim brake locking elements 22 extending between the arm 14 and the wheel 16, wherein the rim brake locking elements are provided with a hammer shaped thickening 23.

The rim 17 is provided on both sides with a circumferential teething 24, wherein the thread protector 18 respectively arranged on the opposite side includes an inner teething 25 arranged opposite to the rim brake locking elements 22.

The insides of the arms 14 are respectively provided with an actuation contour 26 that thickens in upward direction and is formed opposite to the hammer shaped thickenings 23 of the rim brake locking element 22 and is formed on the inside.

The actuation contour 26 is arranged at an inner side of the arm and/or at an outside of the thread protector, wherein the actuation contour moves a teething arranged at an inside of the tread protector into a circumferential teething provided at the rim when the foot lever is actuated.

Figure 4:
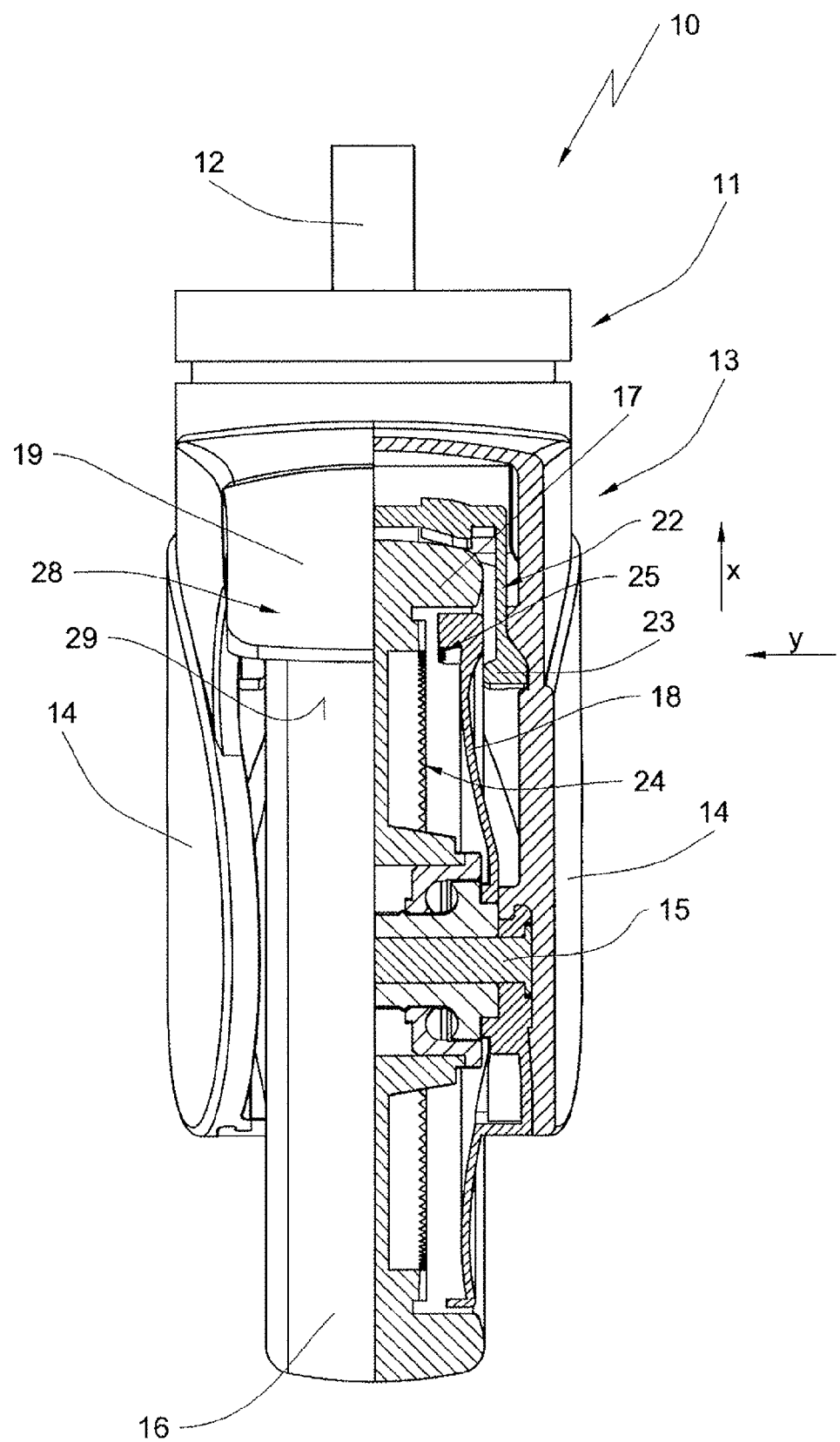
FIG. 4 illustrates a partial sectional view of a one-wheel steering caster in non-braked condition.

In FIGS. 2 and 4, the condition of the non-braked and non-directionally fixated one wheel steering caster 10 is illustrated. Thus, it is visible in FIG. 2 that the directional fixation device 21 is arranged below a gear sprocket 27 connected with the rear bolt 12 and that the hammer shaped thickening 23 of the rim brake locking element 22 is arranged opposite to the lower narrow section of the actuation contour 26 so that the wheel 16 is not braked and not directionally fixated.

Figure 3:
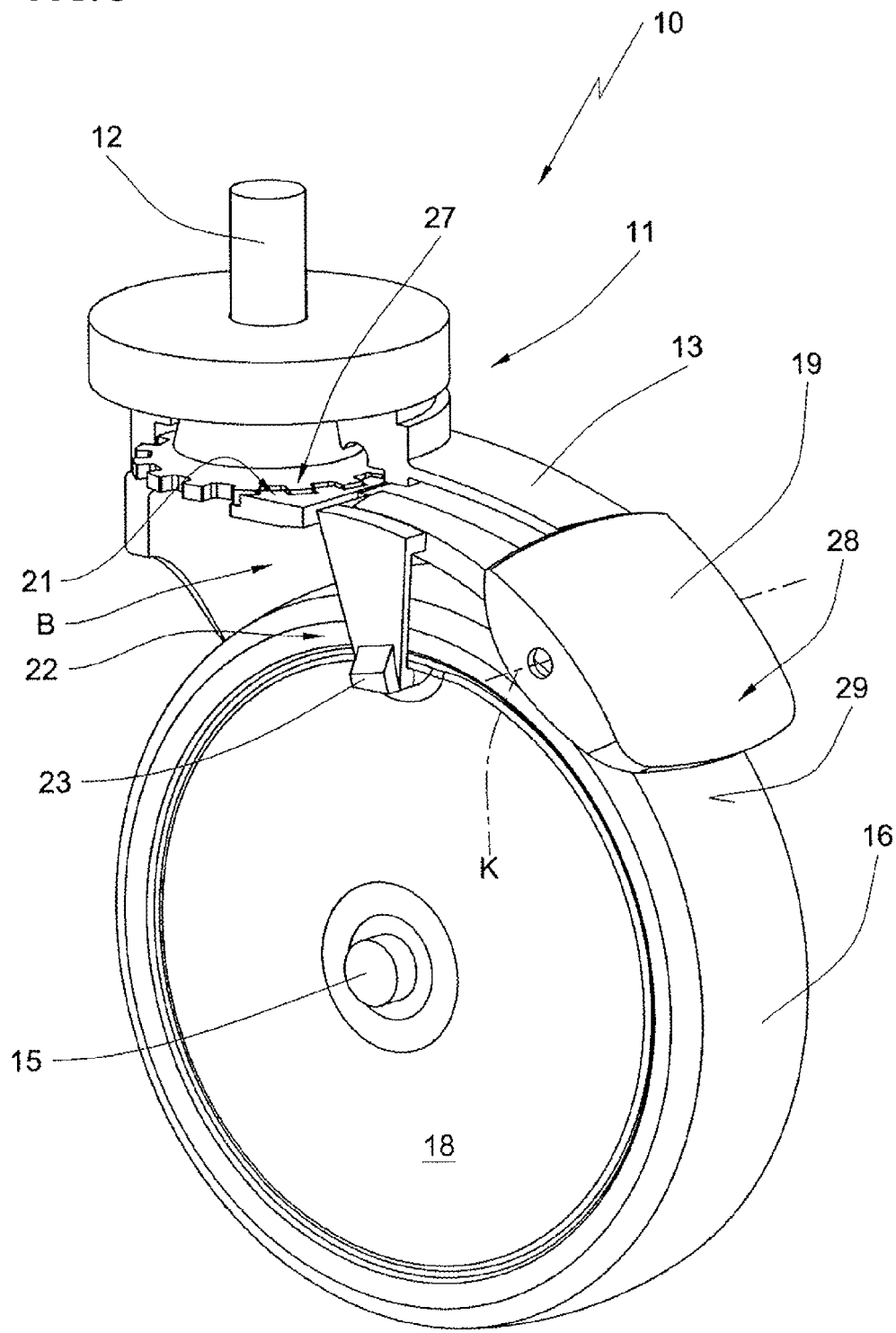
FIG. 3 illustrates a one-wheel steering caster according to FIG. 1 with a partially removed support component in braked condition.
Figure 5:
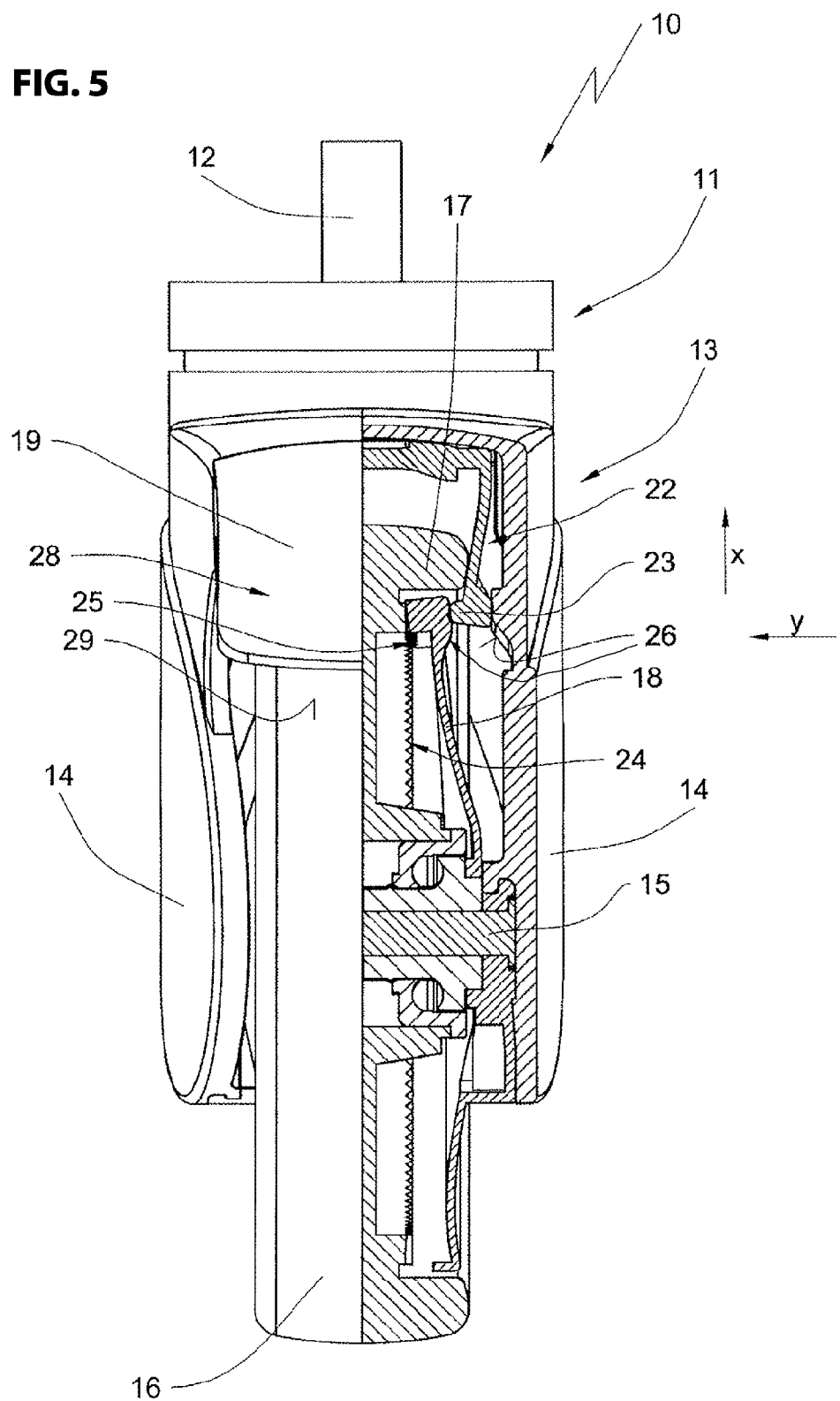
FIG. 5 illustrates a partial sectional view of a one-wheel steering caster in braked condition.

In FIGS. 3 and 5, the braked directionally fixated condition of the one-wheel steering caster 10 is illustrated.

Through actuation in a free end section 28 the foot lever 19 is pressed in a direction towards the wheel surface 29, wherein a rib that is arranged below the foot lever 19 facilitates a shift angle limitation since the rib is supported at an end of a shifting path on the wheel surface 29. Through actuating the foot lever 19, on the one hand side the directional fixation device 21 is moved into the movement range of the tooth sprocket 27 and a directional fixation is provided. Simultaneously, the lateral rim brake locking devices 22 arranged at the directional fixation element are raised with their hammer shaped thickenings 23 in X-direction, wherein they are pressed through the actuation contour 26 in Y-direction towards the thread protector 18 which makes the thread protector 18 with its inner teething 25 engage the circumferential teething 24 of the rim 17 in a form locking manner. This provides form locking wheel fixation.

The described provision of wheel fixation is apparent in particular when comparing FIGS. 4 and 5. Thus it is also apparent that according to the described solution the rim brake locking element 22 supporting the hammer shaped thickening 23 has to be arranged in a flexible or pivotable manner at the brake device B. Additionally, at least the portion of the thread protector 18 interacting with the rim brake locking element 22 has to be made from flexible resilient material.

What is claimed is:

1. A steering caster, comprising:
a head element;
a support element including at least one arm;
a foot lever actuating a directional fixation device and a brake component;
a wheel including a rim and a rotation axis, the rim having circumferential teething extending in an axial direction;
at least one thread protector connected with the at least one arm and mounted along the rotation axis and covering the rim and having teething extending in an axial direction on a side of the at least one thread protector adjacent the wheel, the teething configured to engage the circumferential teething, and the at least one thread protector having a side adjacent the at least one arm; and
at least one actuation contour on the at least one arm,
wherein the brake component includes at least one rim brake locking element that is connected to the foot lever and the at least one rim brake locking element is arranged between the side of the at least one thread protector adjacent the at least one arm and the at least one arm, the at least one actuation contour engaging the at least one rim brake locking element, and
wherein actuating the foot lever raises the at least one brake locking element, and the at least one actuation contour causes the at least one brake locking element to move the at least one thread protector in the axial direction towards the wheel into engaging the teething with the circumferential teething.

2. The steering caster according to claim 1, wherein the brake device includes two rim brake locking elements arranged on both sides of the wheel respectively between the at least one arm and the at least one thread protector.

3. A steering caster, comprising:
a head element;
a support element including at least one arm;
a foot lever actuating a directional fixation device and a brake component;
a wheel including a rim and a rotation axis, the rim having circumferential teething extending in an axial direction;
at least one thread protector connected with the at least one arm and mounted along the rotation axis and covering the rim and having teething extending in an axial direction on a side of the at least one thread protector adjacent the wheel, the teething configured to engage the circumferential teething, and the at least one thread protector having a side adjacent the at least one arm; and
at least one actuation contour on the at least one arm and on a side of the at least one thread protector oriented towards the at least one arm,
wherein the brake component includes at least one rim brake locking element that is connected to the foot lever and the at least one rim brake locking element is arranged between the side of the at least one thread protector adjacent the at least one arm and the at least one arm, the at least one actuation contour engaging the at least one rim brake locking element, and
wherein actuating the foot lever raises the at least one brake locking element, and the at least one actuation contour causes the at least one brake locking element to move the at least one thread protector in the axial direction towards the wheel into engaging the teething with the circumferential teething.

4. The steering caster according to claim 3, wherein the brake device includes two rim brake locking elements arranged on both sides of the wheel respectively between the at least one arm and the at least one thread protector.

* * * * *